United States Patent
Zhang et al.

(10) Patent No.: US 9,455,848 B1
(45) Date of Patent: Sep. 27, 2016

(54) DFE-SKEWED CDR CIRCUIT

(71) Applicant: Xilinx, Inc., San Jose, CA (US)

(72) Inventors: Hongtao Zhang, San Jose, CA (US);
Geoffrey Zhang, San Jose, CA (US);
Kun-Yung Chang, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/829,318

(22) Filed: Aug. 18, 2015

(51) Int. Cl.
*H04L 25/03* (2006.01)
*H04L 7/00* (2006.01)

(52) U.S. Cl.
CPC ....... *H04L 25/03057* (2013.01); *H04L 7/0025* (2013.01); *H04L 7/0079* (2013.01); *H04L 2025/03611* (2013.01)

(58) Field of Classification Search
CPC ... H04L 7/002; H04L 7/0025; H04L 7/0029; H04L 7/0058; H04L 7/0062; H04L 7/0079; H04L 25/026; H04L 25/03006; H04L 25/03019; H04L 25/03057; H04L 25/03082; H04L 25/03108; H04L 25/03611
USPC ........ 375/232, 233, 346, 348, 350; 708/322, 708/323
See application file for complete search history.

(56) References Cited

U.S. PATENT DOCUMENTS

| | | | | |
|---|---|---|---|---|
| 8,654,830 B1* | 2/2014 | Lin | .................... | H04L 25/03057 375/229 |
| 2012/0076181 A1* | 3/2012 | Aziz | .................. | H04L 25/03057 375/219 |
| 2012/0192023 A1* | 7/2012 | Lee | .................. | H03K 3/356173 714/746 |
| 2014/0281845 A1* | 9/2014 | Cyrusian | ........... | H04L 25/03057 714/819 |
| 2015/0180642 A1* | 6/2015 | Hsieh | .................... | H04L 7/0025 375/233 |
| 2016/0065394 A1* | 3/2016 | Sindalovsky | ......... | H04L 7/0033 375/371 |

* cited by examiner

*Primary Examiner* — Young T Tse
(74) *Attorney, Agent, or Firm* — Robert M. Brush

(57) ABSTRACT

In an example, an apparatus for clock data recovery (CDR) in a receiver includes a decision feedback equalizer (DFE) having a data slicer providing data samples, an error slicer providing error samples, and an offset error slicer providing offset error samples, the offset error slicer operable to set its threshold based on an offset first post-cursor coefficient. The apparatus further includes a CDR circuit operable to control a sampling clock for the data slicer, the error slicer, and the offset error slicer based on the data samples and the offset error samples.

19 Claims, 9 Drawing Sheets

DFE-SKEWED CDR CIRCUIT

TECHNICAL FIELD

Examples of the present disclosure generally relate to electronic circuits and, in particular, to a decision feedback equalizer (DFE)-skewed clock data recovery (CDR) circuit.

BACKGROUND

Clock data recovery (CDR) is an important block in a receiver system for high-speed serial communications. The CDR block generates the correct sampling clock phase for data recovery. The quality of the high-speed serial communication link can be sensitive to the sampling dock phase, especially in the presence of jitter and noise.

One type of existing CDR is an edge-sampled CDR. An edge-sampled CDR oversamples the analog input waveform to generate the correct data sampling dock and recover the transmitted data. The edge-sampled CDR assumes the data to be sampled at around the center between zero-crossing points. The resulting oversampled system consumes more clocking power than a system operating at the symbol rate (also referred to as baud-rate).

SUMMARY

Techniques for providing a decision feedback equalizer (DFE)-skewed clock data recovery (CDR) circuit are described. In an example, an apparatus for clock data recovery (CDR) in a receiver includes a decision feedback equalizer (DFE) having a data slicer providing data samples, an error slicer providing error samples, and an offset error slicer providing offset error samples, the offset error slicer operable to set its threshold based on an offset first post-cursor coefficient. The apparatus further includes a CDR circuit operable to control a sampling clock for the data slicer, the error slicer, and the offset error slicer based on the data samples and the offset error samples.

In another example, a receiver includes an analog front end (AFE) operable to receive an analog signal from a channel. The receiver further includes a decision feedback equalizer (DFE) having a data slicer operable to generate data samples from output of the AFE, an error slicer operable to generate error samples from output of the AFE, and an offset error slicer operable to generate offset error samples from output of the AFE, the offset error slicer operable to set its threshold based on an offset first post-cursor coefficient. The receiver further includes a decision adapt circuit operable to generate pulse response coefficients for the DFE based on the data samples, the error samples, and the offset error samples. The receiver further includes a CDR circuit operable to control a sampling clock for the data slicer, the error slicer, and the offset error slicer based on the data samples and the offset error samples.

In another example, a method of clock data recovery (CDR) for a receiver includes generating, at a baud rate, data samples from a received signal using a data slicer of a decision feedback equalizer (DFE); generating, at the baud rate, error samples from the received signal using an error slicer of the DFE; generating, at the baud rate, offset error samples from the received signal using an offset error slicer of the DFE, the offset error slicer operable to set its threshold based on an offset first post-cursor coefficient; and generating a sampling clock for the data slicer, the error slicer, and the offset error slicer based on the data samples and the offset error samples.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
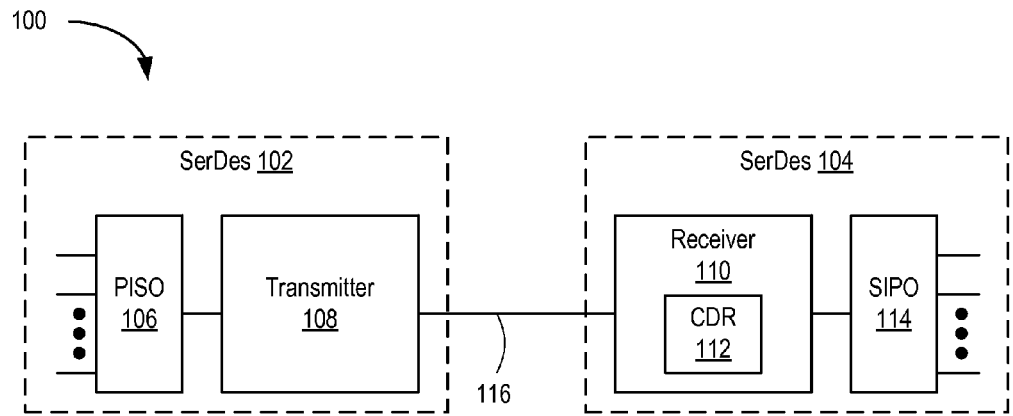
FIG. 1 is a block diagram depicting an example communication system.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated, or if not so explicitly described.

Baud-rate clock data recovery (CDR) circuits can be used in serial link systems as opposed to oversampling CDR circuits. Oversampling CDR circuits require more clocks and consume more power than baud-rate CDR circuits. A Mueller-Muller CDR (MM-CDR) is one type of baud-rate CDR circuit. An MM-CDR locks the coefficient of the first pre-cursor ($h_{-1}$) to the coefficient of the first post-cursor ($h_1$) of a cascaded channel, which includes both passive and active portions of the link.

A decision feedback equalizer (DFE) can be used in serial link systems, particularly when the data rate is above 5 gigabits per second (Gbps). In the presence of a DFE, the first post-cursor coefficient ($h_1$) is reduced to near zero through the adaptation algorithm. In response, the MM-CDR will push the locking point near $h_{-1}=0$, making the converged locking location too early in most cases, as well as making the locking location sensitive to channel and transmitter de-emphasis settings. In addition, the first post-cursor coefficient ($h_1$) adapts to a higher value to account for the additional inter-symbol interference (ISI) during the converging process.

In examples described herein, the algorithm employed by an MM-CDR is modified by skewing the DFE equalization. As a result, the locking phase can be controlled, rather than being fixed at $h_{-1}=h_0$ in the presence of the DFE. In further examples described herein, a technique is described that allows a CDR to lock around the center of the pulse response through automatic DFE offset adjustment by checking the peaking amplitude around the sampling phase. Such a technique achieves good bit error rate (BER) performance and better jitter tolerance. These and other aspects are described below with respect to the following figures.

FIG. 1 is a block diagram depicting an example communication system 100. The communication system 100 comprises a transmitter 108 coupled to a receiver 110 via a channel 116. In an example, the transmitter 108 is a part of a serializer/deserializer (SerDes) 102, and the receiver 110 is part of a SerDes 104. For clarity, the deserialization circuitry is omitted from the SerDes 102, and the serialization circuitry is omitted from the SerDes 104. The SerDes 102 includes a parallel-in-serial-out (PISO) circuit 106 that converts parallel input data to serial output data for transmission over the channel 116 by the transmitter 108. The SerDes 104 includes a serial-in-parallel-out (SIPO) circuit that converts serial data output by the receiver 110 to parallel output data. The SerDes 102 and the SerDes 104 can include other circuitry (not shown), such as decoders, encoders, and the like.

While the SerDes 102 and the SerDes 104 are shown, in other examples, each of the transmitter 108 and/or the receiver 110 can be a stand-alone circuit not being part of a larger transceiver circuit. In some examples, the transmitter and the receiver 110 can be part of one or more integrated circuits (ICs), such as application specific integrated circuits (ASICs) or programmable ICs, such as field programmable gate arrays (FPGAs).

The channel 116 can include an electrical or optical transmission medium. An electrical transmission medium can be any type of electrical path between the transmitter 108 and the receiver 110, which can include metal traces, vias, cables, connectors, decoupling capacitors, termination resistors, and the like. The electrical transmission medium can be a differential signal path. An optical transmission medium can be any type of optical path between the transmitter 108 and the receiver 110, which can include any kind of optical modules.

In an example, the transmitter 108 transmits serialized data over the channel 116 using a digital baseband modulation, such as a binary non-return-to-zero (NRZ) modulation, multilevel pulse amplitude modulation (PAM-n), or the like. In NRZ modulation, each transmitted symbol comprises one bit. In multilevel PAM, each symbol comprises multiple bits. For example 4-level PAM (PAM4) includes four levels and can be used to transmit two-bit symbols. In general, the transmitter 108 transmits the serialized data as a sequence of symbols using a particular modulation scheme. There are two possible values for each symbol in NRZ modulation, and there are n possible values for each symbol in PAM-n modulation. The rate at which the transmitter 108 transmits the symbols is referred to as the symbol-rate or baud-rate.

The transmitter 108 does not transmit a reference clock with the data. Rather, the receiver 110 includes a clock data recovery (CDR) circuit 112 (or CDR 112) for extracting a clock from the incoming symbol stream. The extracted clock is sequentially used to sample the incoming symbol stream and recover the transmitted bits. As described herein, the CDR circuit 112 operates at the baud-rate, rather than oversampling the incoming symbol stream. As such, the CDR circuit 112 conserves power compared to oversampling CDR circuits.

Figure 2:
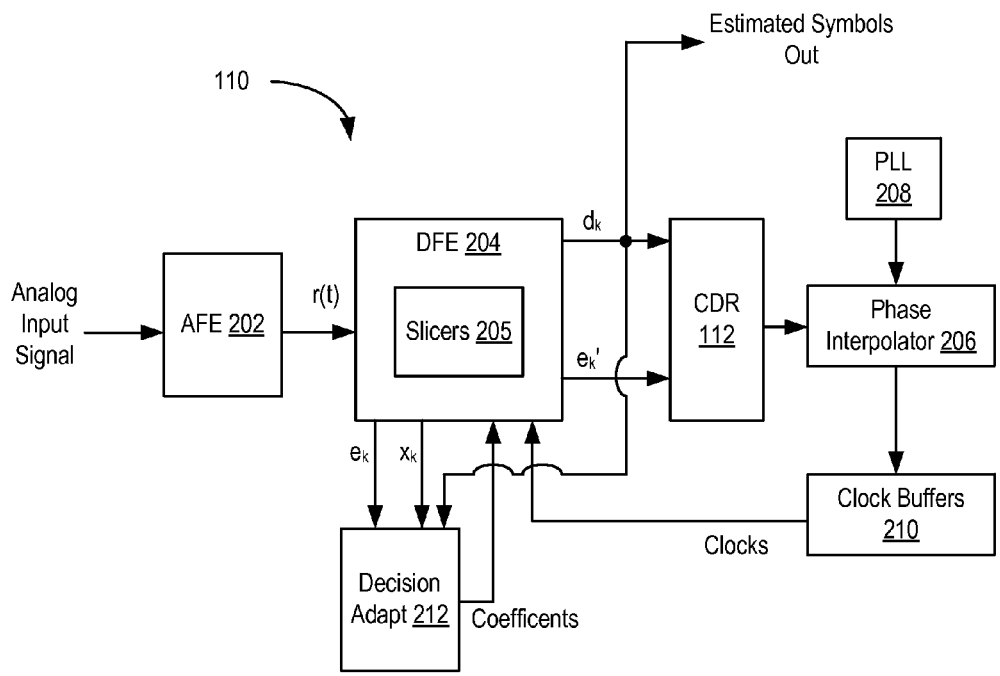
FIG. 2 is a block diagram depicting an example of receiver.

FIG. 2 is a block diagram depicting an example of the receiver 110. The receiver 110 includes an analog front end (AFE) 202, a decision feedback equalizer (DFE) 204, the CDR 112, a phase interpolator 206, a phase locked loop (PLL) 208, clock buffers 210, and decision adapt circuit 212. The AFE 202 includes an input operable to receive an analog input signal from the channel 116. The channel 116 degrades the signal quality of the transmitted analog signal. Channel insertion loss is the frequency-dependent degradation in signal power of the analog signal. When signals travel through a transmission line, the high frequency components of the analog signal are attenuated more than the low frequency components. In general, channel insertion loss increases as frequency increases. Signal pulse energy in the analog signal can be spread from one symbol period to another during propagation on the channel 116. The resulting distortion is known as inter-symbol interference (ISI). In general, ISI becomes worse as the speed of the communication system increases. The AFE 202 can include various analog circuits, such as a continuous time linear equalizer (CTLE) circuit, automatic gain control (AGC) circuit, and the like. An output of the AFE 202 provides an analog signal (designated r(t), where t denotes time).

An input of the DFE 204 is coupled to the output of the AFE 202 to receive the analog signal r(t). The DFE 204 includes a plurality of slicers 205 operable to sample the analog signal r(t). The slicers 205 sample the analog signal using sampling clocks (clocks) provided by the clock buffers 210. Each of the slicers 205 operates at the baud-rate (symbol rate). The DFE 204 outputs four sample streams, including a stream of data samples ($d_k$), a stream of error samples ($e_k$), a stream of offset error samples ($e_k'$), and one or more additional streams of samples ($x_k$), for each symbol (k). The data samples $d_k$ provide the estimated output symbols. The decision adapt circuit 212 includes inputs for receiving the error samples $e_k$, the data samples $d_k$, and the samples $x_k$. The decision adapt circuit 212 computes coefficients for the DFE 204 based on the input samples. The DFE 204 and the decision adapt circuit 212 operate to equalize the analog signal to compensate for post-cursor ISI. The offset error samples $e_k'$ and the additional samples $x_k$ are discussed below.

Inputs of the CDR 112 are coupled to outputs of the DFE 204 to receive the data samples $d_k$ and the offset error samples $e_k'$. The CDR 112 generates a sampling phase value per symbol based on the data samples $d_k$ and the offset error samples $e_k$. In an example, the CDR 112 can employ a Mueller-Muller algorithm to generate the sampling phase values. An input of the phase interpolator 206 is coupled to an output of the CDR 112 to receive the sampling phase. Another input of the phase interpolator 206 is coupled to an output of the PLL 208 to receive a clock signal. The phase interpolator 206 adjusts the phase of the clock signal from the PLL 208 based on the sampling phase values output by the CDR 112. An input of the clock buffers 210 is coupled to an output of the phase interpolator 206 to receive the phase adjusted clock signal. The clock buffers 210 output a plurality of clocks, as discussed below.

The CDR 112 operates using the offset error samples $e_k'$, rather than the error samples $e_k$ used by the decision adapt circuit 212. The DFE 204 determines the offset error samples $e_k'$ by skewing (creating an offset in) the first post-cursor coefficient ($h_1$). The first post-cursor coefficient having the offset is referred to herein as $h'_1$. In some examples, $h'_1$ can be a fixed value. In other examples, $h'_1$ can be adapted so that the CDR 112 locks near the center of the pulse response. The slicers 205 can sample the analog signal using clock signals having two different phase offsets relative to the data sampler phase to generate the additional samples $x_k$. The phase offsets can be small as compared to the unit interval (UI) and can be implemented using analog buffer delays in the clock buffers 210. The decision adapt circuit 212 can use the additional samples $x_k$ generated using the offset phase clock(s) to adapt $h'_1$, as discussed below.

Figure 7A:
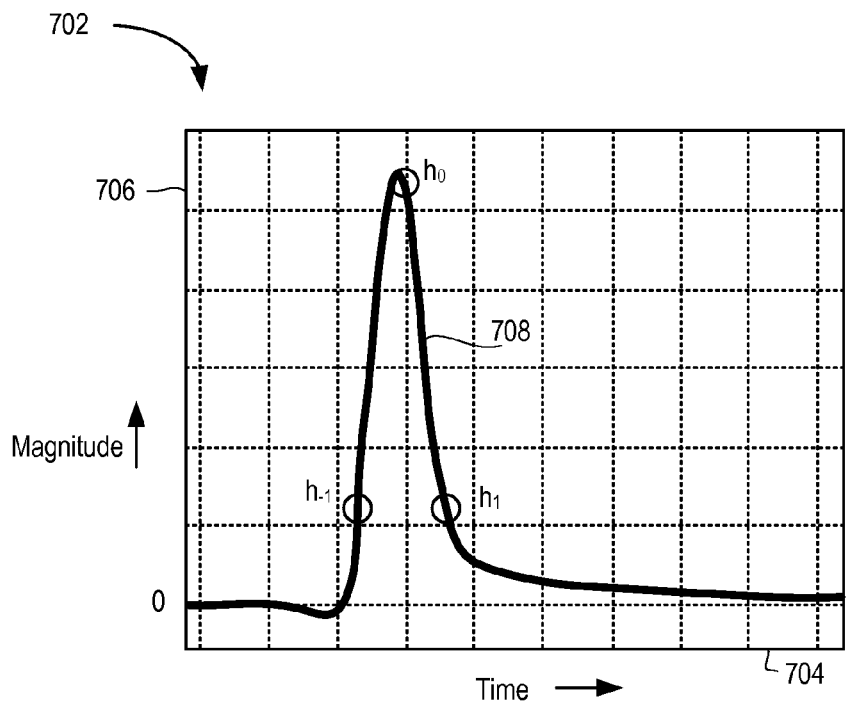
FIG. 7A is a graph depicting a pulse response and Mueller-Muller clock data recovery (MM-CDR) locking scenario without DFE.

FIG. 7A is a graph 702 depicting a pulse response and MM-CDR locking scenario without DFE. The graph 702 includes an axis 704 representing time increasing from left to right (in arbitrary units), and an axis 706 representing magnitude increasing bottom to top (in arbitrary units). A curve 708 shows a pulse response along with the location of the first pre-cursor $h_{-1}$, main cursor $h_0$, and first post-cursor $h_1$ coefficients. The MM-CDR adaptation cost function is $e_k d_{k+1} - e_{k+1} d_k$ (Eq. 1), where $d_k$ is the kth data sample received and $e_k$ is the kth error sample received. The kth error sample can be defined by:

$$e_k = (\Sigma_{l=-\infty}^{\infty} d_{k-l} h_l) - d_k h_0 \qquad \text{Eq. 2}$$

where $h_l$ is the lth pulse response coefficient of the channel. Statistically, the cost function is equivalent to $h_{-1} - h_1$ and the MM-CDR drives the difference between the first pre-cursor coefficient and the first post-cursor coefficient to zero.

Figure 7B:
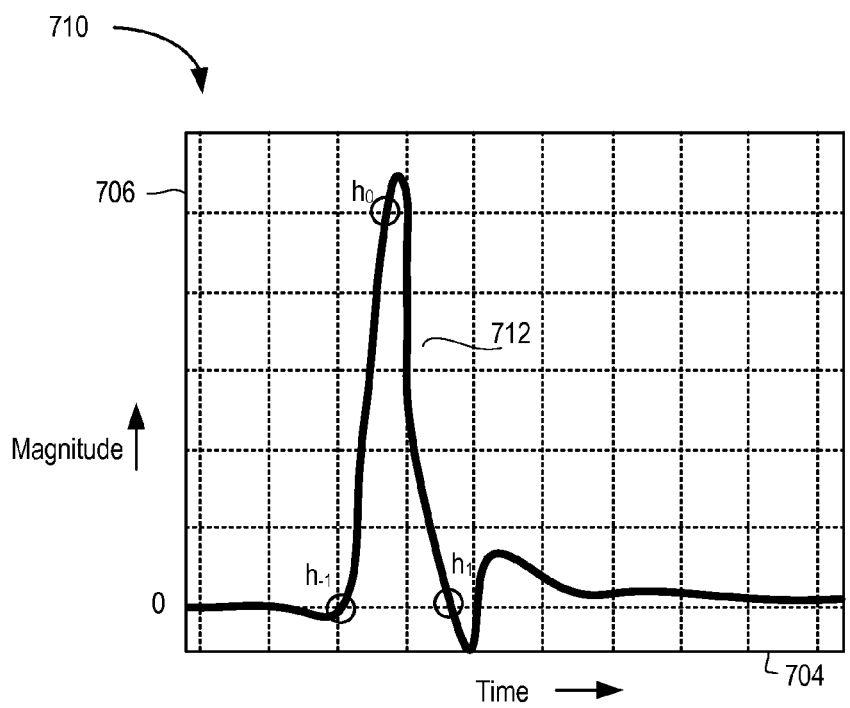
FIG. 7B is a graph depicting a pulse response and MM-CDR locking scenario in the presence of DFE without offset.

FIG. 7B is a graph 710 depicting a pulse response and MM-CDR locking scenario in the presence of DFE without offset. Elements of FIG. 7B that are the same or similar to those of FIG. 7A are designated with identical reference numerals and are described above. In the presence of DFE, the first post cursor coefficient $h_1$ is removed from the error signal and the error becomes:

$$e_k = (\Sigma_{l=-\infty}^{\infty} d_{k-l} h_l) - d_k h_0 - d_{k-1} h_1 \qquad \text{Eq. 3}$$

Statistically, the cost function is equivalent to $h_{-1}$. So in the presence of DFE, the MM-CDR drives the first pre-cursor coefficient to equal 0. This can cause the converged locking location to be too early, as shown in FIG. 7B.

Figure 7C:
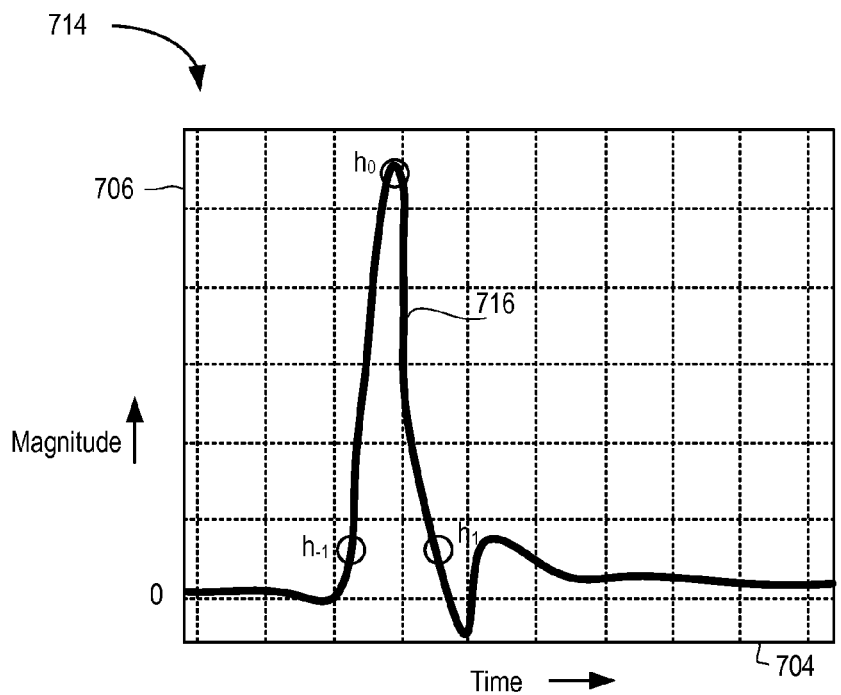
FIG. 7C is a graph depicting a pulse response and MM-CDR locking scenario in the presence of offset DFE according to an example.

FIG. 7C is a graph 714 depicting a pulse response and MM-CDR locking scenario in the presence of offset DFE according to an example. Elements of FIG. 7C that are the same or similar to those of FIG. 7A are designated with identical reference numerals and are described above. By skewing the error samples used by the CDR 112, the Mueller-Muller cost function is modified, allowing the CDR 112 to be locked at any phase. For example, instead of cancelling the first post-cursor coefficient $h_1$ entirely, only a part of the first post-cursor coefficient can be cancelled, as denoted by $h'_1$. In such case, the error becomes:

$$e_k = (\Sigma_{l=-\infty}^{\infty} d_{k-l} h_l - d_k h_0 - d_{k-1} h_1') \qquad \text{Eq. 4}$$

Statistically, the cost function becomes $h_{-1} - (h_1 - h_1') = h_{-1} - \Delta h_1$, where $\Delta h_1$ is the residue first post-cursor coefficient that is not canceled out in the offset error samples. As a result, the locking phase of the CDR 112 becomes $h_{-1} = \Delta h_1$, which is in the center of the pulse response as shown in FIG. 7C. Further, the offset first post-cursor coefficient $h'_{-1}$ can be adapted so that the CDR 112 maintains a lock to the center of the pulse response.

Figure 3:
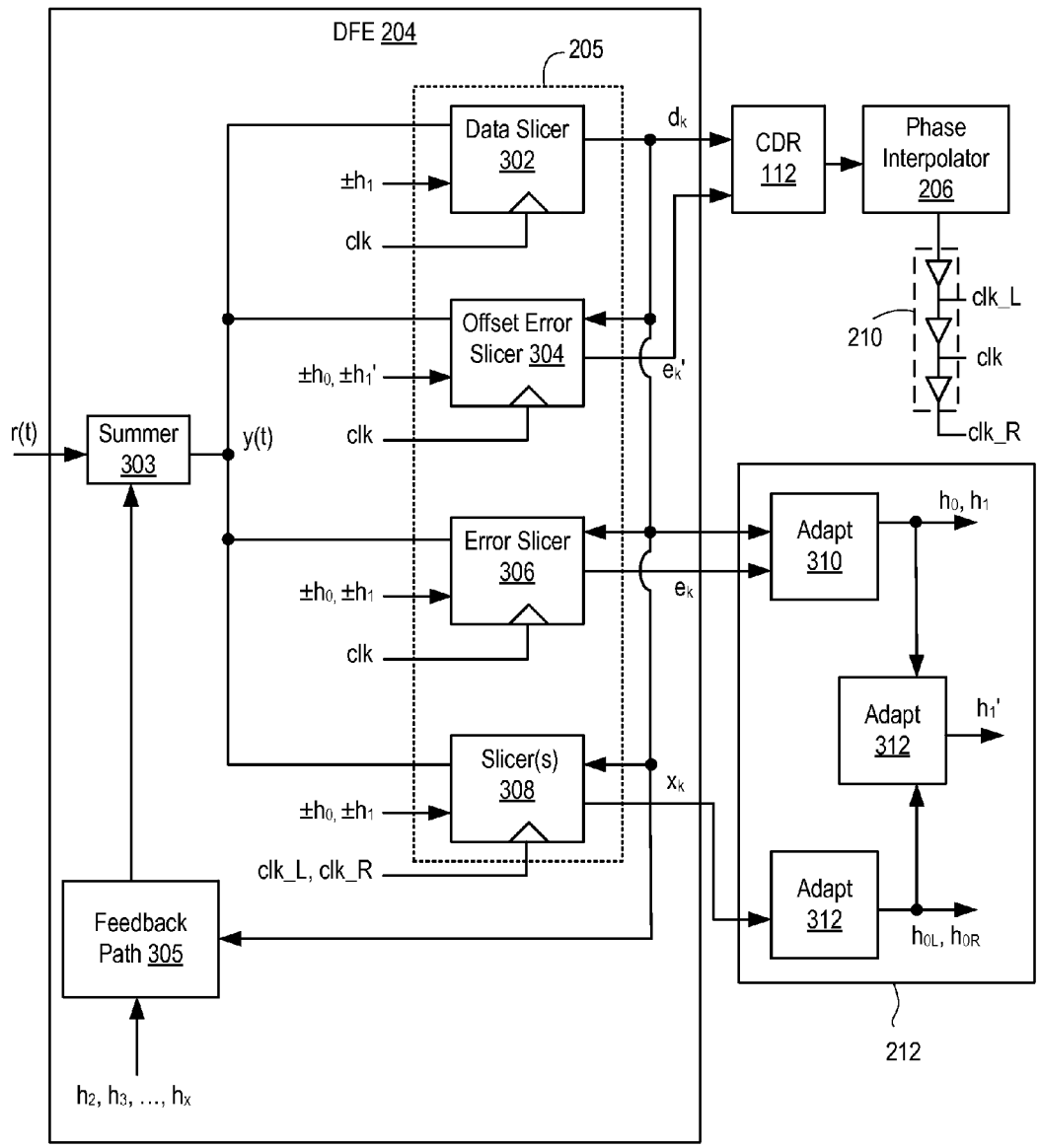
FIG. 3 is a block diagram depicting an example of a decision feedback equalizer (DFE) and decision adapt circuit.

FIG. 3 is a block diagram depicting an example of the DFE 204 and the decision adapt circuit 212. The DFE 204 includes a summer 303, a feedback path 305, and the slicers 205. The slicers 205 include a data slicer 302, an offset error slicer 304, an error slicer 306, and one or more slicers 308. The decision adapt circuit 212 includes adapt logic 310, adapt logic 312, and adapt logic 312.

An input to the summer 303 receives the analog signal r(t) from the AFE 202, and another input of the summer 303 is coupled to an output of the feedback path 305. The summer 303 sums the analog signal r(t) with the output of the feedback path 305 to generate an analog signal y(t). The analog signal y(t) is coupled to each of the slicers 302 through 308.

An input of the data slicer 302 is coupled to the output of the summer 303 to receive the analog signal y(t). A threshold of the data slicer 302 is set based on the first post-cursor coefficient $h_1$. In the present example, the DFE 204 comprises a speculative or "look-ahead" architecture. In a speculative architecture, the first tap ($h_1$) is "unrolled" and removed from the feedback path 305. The basic concept behind a speculative DFE is that every symbol is a logic "0" or a logic "1" and the decision threshold for both possibilities is known. Thus, the data slicer 302 makes two separate decisions for each symbol on parallel sampling paths using two separate decision thresholds $h_1$ and $-h_1$. The parallel sampling paths are multiplexed to select the "correct" decision based on the previously selected decision. The data slicer 302 samples the signal y(t) according to a clock signal (clk) output by the clock buffer 210 to generate the data samples $d_k$.

An input of the offset error slicer 304 is coupled to the output of the summer 303 to receive the analog signal y(t). A threshold of the offset error slicer 304 is set based on a combination of the main cursor coefficient $h_0$ and the offset first post-cursor coefficient $h'_1$. The offset error slicer 304 generates separate samples on parallel decision paths using decision threshold generated from combinations of $h_0$ and $h'_1$. The parallel sampling paths are multiplexed to select the "correct" offset error based on a previous data sample. The offset error slicer 304 samples the signal y(t) according to the clock signal clk to generate the offset error samples $e_k'$.

An input of the error slicer 306 is coupled to the output of the summer 303 to receive the analog signal y(t). A threshold of the error slicer 306 is set based on a combination of the main cursor coefficient $h_0$ and the first post-cursor coefficient $h_1$. The error slicer 306 generates separate samples on parallel decision paths using a decision threshold generated from combinations of $h_0$ and $h_1$. The parallel sampling paths are multiplexed to select the "correct" error based on a previous data sample. The error slicer 306 samples the signal y(t) according to the clock signal clk to generate the error samples $e_k$.

Input(s) of the slicer(s) 308 is/are coupled to the output of the summer 303 to receive the analog signal y(t). In some examples, one slicer 308 is provided. In other examples, two slicers 308 are provided. A threshold of each slicer 308 is set based on a combination of the main cursor coefficient $h_0$ and the first post-cursor coefficient $h_1$. Each of the slicers 308 generates separate samples on parallel decision paths using a decision threshold generated from combinations of $h_0$ and $h_1$. The parallel sampling paths are multiplexed to select the "correct" value based on a previous data sample. Each of the slicers 308 samples the signal y(t) according to a clock signal having a phase offset from the clock signal clk. In an example, one slicer 308 can sample y(t) using either a clock signal clk_L (early with respect to clk) or a clock signal clk_R (late with respect to clk). In another example, a first slicer 308 can sample y(t) using a clock signal clk_L and a second slicer can sample y(t) using a clock signal clk_R. The clock signals clk_L and clk_R can be generated by the clock buffer 210. The phase offset for each of clk_L and clk_R can be less than the UI period.

The decision adapt circuit 212 generates values for the pulse response coefficients used by the DFE 204. Inputs of the adapt logic 310 receive the data samples and the error samples. The adapt logic 310 computes values for the main cursor coefficient and the first post-cursor coefficient using any known algorithm suitable for generating pulse response coefficients for a DFE. Inputs of the adapt logic 312 receive the samples $x_k$ from the slicer(s) 308. The adapt logic 312 computes values for the main cursor coefficient $h_0$ based on the early clock clk_L, the late clock clk_R, or both, referred to as $h_{OL}$ and $h_{OR}$. Inputs of the adapt logic 312 receive the main cursor coefficient $h_0$, the first post-cursor coefficient $h_1$, and the coefficients $h_{OL}$ and/or $h_{OR}$. The adapt logic 312 computes values for the offset first post-cursor coefficient $h'_1$ based on an algorithm described below. The decision adapt circuit 212 also generates second, third, fourth, etc. post-cursor coefficients for use by the feedback path 305 using any known adaptation algorithm.

Figure 7D:
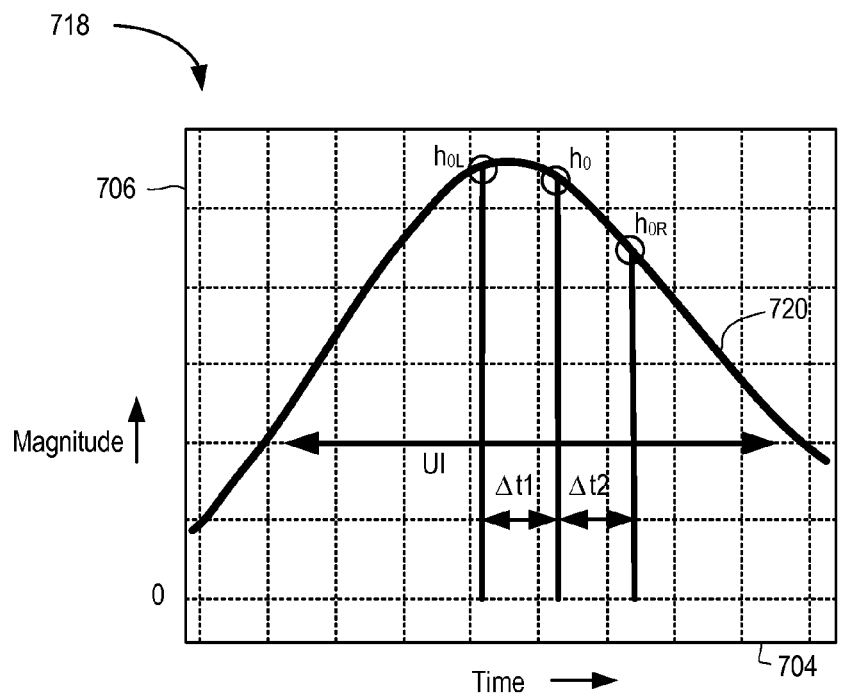
FIG. 7D is a graph depicting more detail of a pulse response and MM-CDR locking scenario in the presence of offset DFE according to an example.

FIG. 7D is a graph 718 depicting more detail of a pulse response and MM-CDR locking scenario in the presence of offset DFE according to an example. Elements of FIG. 7D that are the same or similar to those of FIG. 7A are designated with identical reference numerals and are described above. Assume two slicers 308 are provided that sample based on clk_L and clk_R, respectively. The two slicers 308 have a phase offset of Δt1 and Δt2 relative to the data sampler phase. The phase offsets Δt1 and Δt2 are small relative to the UI. Output of the slicers 308 can be used to generate the magnitude of the pulse response, $h_{OL}$ and $h_{OR}$, at these two sampling phases. Table 1 shows an example algorithm used by the adapt logic 312 for $h'_1$ adaptation.

TABLE 1

| Condition | $h_{OL} > h_{OR}$ | $h_{OL} > h_{OR}$ | $h_{OL} > h_{OR}$ |
|---|---|---|---|
| Locking phase Vote for $h'_1$ | Late Increment | Early Decrement | Center No vote |

As shown in Table 1, if $h_{OL} > h_{OR}$ then the locking phase is late and the adapt logic 312 increments the value of $h'_1$. If $h_{OL} < h_{OR}$ then the locking phase is early and the adapt logic 312 decrements the value of $h'_1$. If $h_{OL} = h_{OR}$ then the locking phase is centered and the adapt logic 312 maintains the value of $h'_1$. In some examples, only one slicer 308 can be used. Table 2 shows an example algorithm used by the adapt logic 312 for $h'_1$ adaptation based on only one slicer 308.

TABLE 2

| Condition | $h_0 > h_{OR}$ | $h_0 < h_{OR}$ | $h_0 = h_{OR}$ |
|---|---|---|---|
| Locking phase Vote for $h'_1$ | Late Increment | Early Decrement | Center No vote |

As shown in Table 2, assume only one slicer 308 is used based on the clock signal clk_R (late clock signal). If $h_0 > h_{OR}$ then the locking phase is late and the adapt logic 312 increments the value of $h'_1$. If $h_0 < h_{OR}$ then the locking phase is early and the adapt logic 312 decrements the value of $h'_1$. If $h_0 = h_{OR}$ then the locking phase is centered and the adapt logic 312 maintains the value of $h'_1$. A similar algorithm can be implemented using only one slicer 308 based on the clock signal clk_L (early clock signal).

Figure 4A:
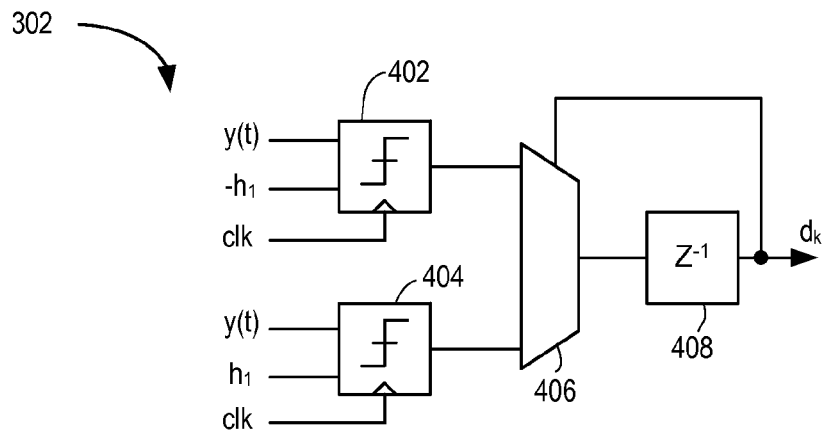
FIG. 4A is a block diagram depicting an example of a data slicer for a speculative DFE.

FIG. 4A is a block diagram depicting an example of the data slicer 302 for a speculative DFE. The data slicer 302 includes a slicer circuit 402, a slicer circuit 404, a multiplexer 406, and a delay circuit 408. The slicer circuits 402 and 404 each sample the analog signal y(t) based on the clock signal clk. A decision threshold of the slicer circuit 402 is set based on $-h_1$, and a decision threshold of the slicer circuit 404 is set based on $h_1$. Outputs of the slicer circuits 402 and 404 are coupled to inputs of the multiplexer 406. A control input of the multiplexer 406 receives the data sample $d_k$. An output of the multiplexer 406 is coupled to an input of the delay circuit 408. An output of the delay circuit 408 provides the data sample $d_k$.

Figure 4B:
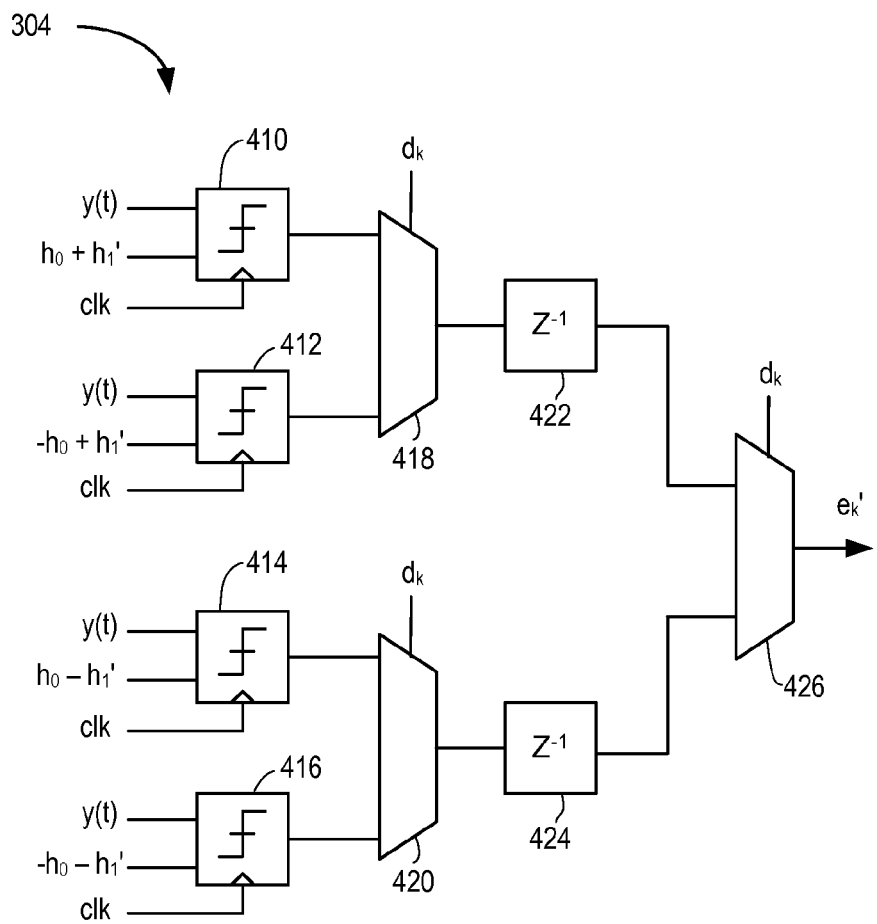
FIG. 4B is a block diagram depicting an example of an offset error slicer for a speculative DFE.

FIG. 4B is a block diagram depicting an example of the offset error slicer 304 for a speculative DFE. The offset error slicer 304 includes slicer circuits 410, 412, 414, and 416. The slicer circuits 410 through 416 each sample the analog signal y(t) based on the clock signal clk. A decision threshold of the slicer circuit 410 is set based on $h_0 + h'_1$. A decision threshold of the slicer circuit 412 is set based on $-h_0 + h'_1$. A decision threshold of the slicer circuit 414 is set based on $h_0 - h'_1$. A decision threshold of the slicer circuit 416 is set based on $-h_0 - h'_1$. Outputs of the slicer circuits 410 and 412 are coupled to inputs of a multiplexer 418. Outputs of the slicer circuits 414 and 416 are coupled to inputs of a multiplexer 420. Control inputs of the multiplexers 418 and 420 receive the data sample $d_k$. An output of the multiplexer 418 is coupled to an input of a delay circuit 422. An output of the multiplexer 420 is coupled to an input of a delay circuit 424. Inputs of a multiplexer 426 are coupled to outputs of the delay circuits 422 and 424, respectively. A control input of the multiplexer 426 receives the data sample $d_k$. An output of the multiplexer 426 provides the offset error sample $e_k'$.

Figure 4C:
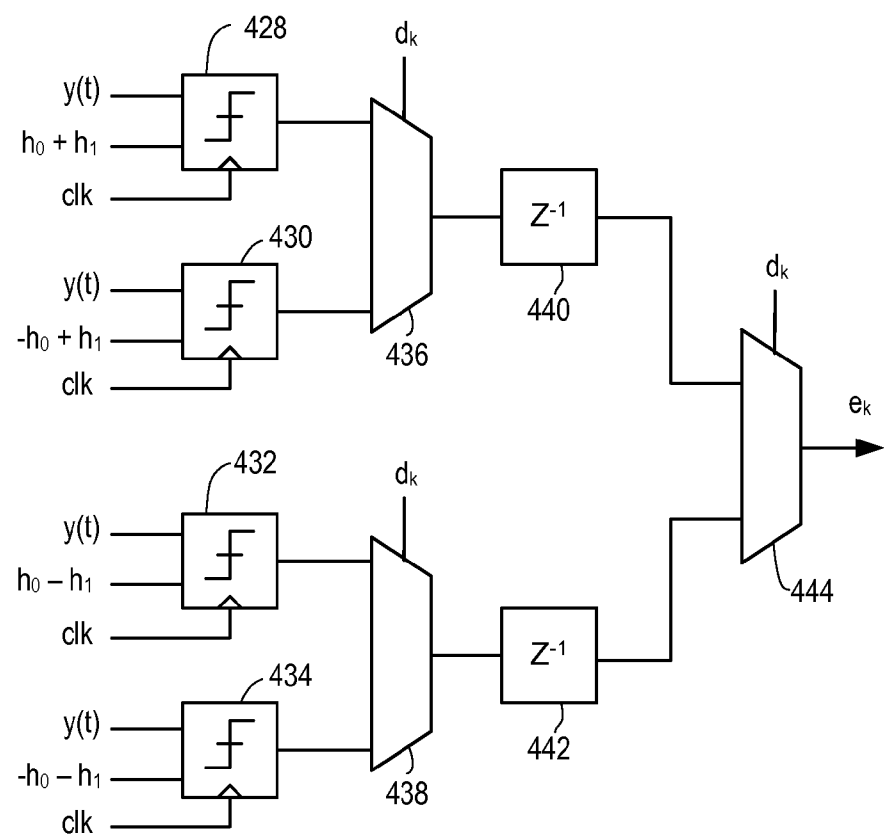
FIG. 4C is a block diagram depicting an example of an error slicer for a speculative DFE.

FIG. 4C is a block diagram depicting an example of the error slicer 306 for a speculative DFE. The offset error slicer 306 includes slicer circuits 428, 430, 432, and 434. The slicer circuits 428 through 434 each sample the analog signal y(t) based on the clock signal clk. A decision threshold of the slicer circuit 428 is set based on $h_0 + h'_1$. A decision threshold of the slicer circuit 430 is set based on $-h_0 + h'_1$. A decision threshold of the slicer circuit 432 is set based on $h_0 - h'_1$. A decision threshold of the slicer circuit 434 is set based on $-h_0 - h'_1$. Outputs of the slicer circuits 428 and 430 are coupled to inputs of a multiplexer 436. Outputs of the slicer circuits 432 and 434 are coupled to inputs of a multiplexer 438. Control inputs of the multiplexers 436 and 438 receive the data sample $d_k$. An output of the multiplexer 436 is coupled to an input of a delay circuit 440. An output of the multiplexer 438 is coupled to an input of a delay circuit 442. Inputs of a multiplexer 444 are coupled to outputs of the delay circuits 440 and 442, respectively. A control input of the multiplexer 444 receives the data sample $d_k$. An output of the multiplexer 444 provides the error sample $e_k$.

Figure 4D:
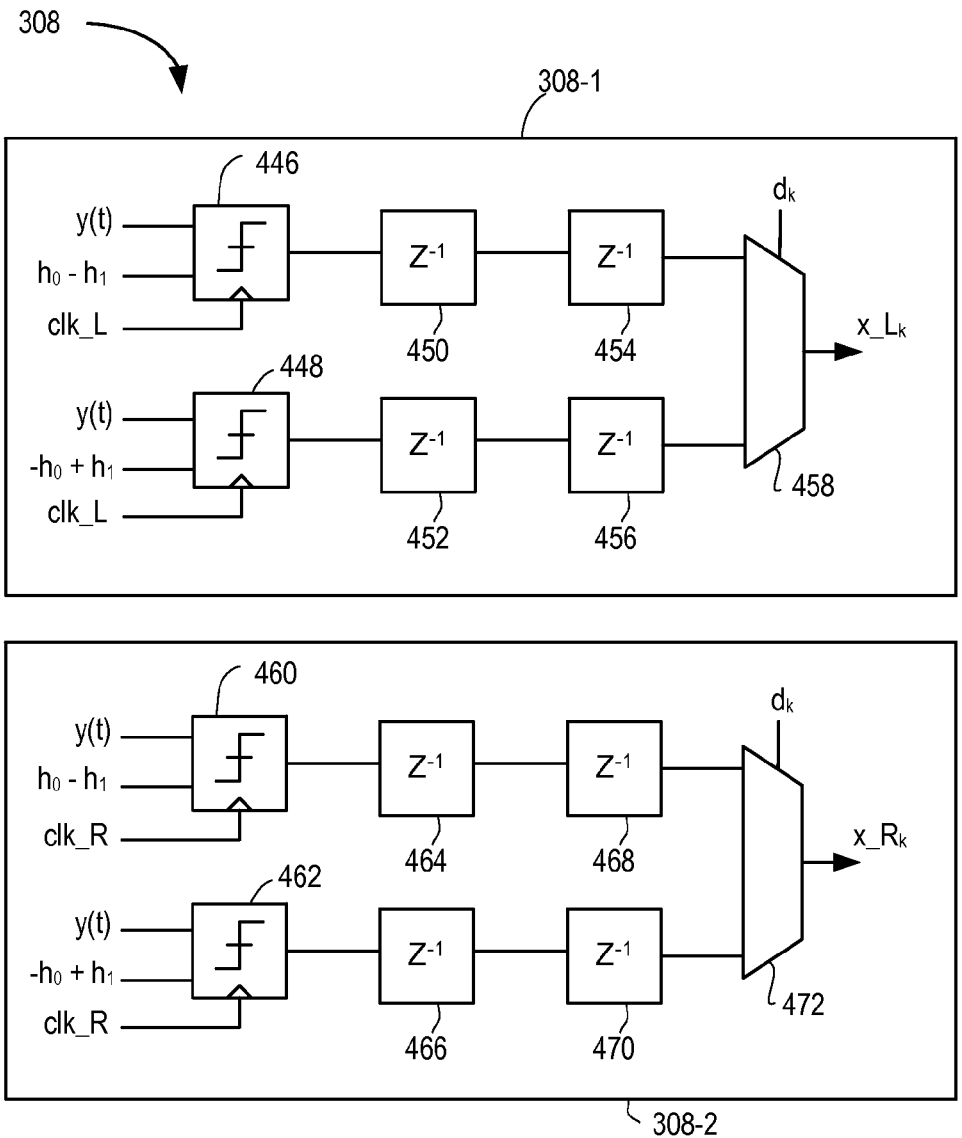
FIG. 4D is a block diagram depicting an example of additional slicers for a speculative DFE.

FIG. 4D is a block diagram depicting an example of the slicers 308 for a speculative DFE. In the example, slicers 308 includes a slicer 308-1 and a slicer 308-2. The slicer 308-1 operates based on the early clock clk_L, and the slicer 308-2 operates based on the late clock clk_R.

The slicer 308-1 includes a slicer circuit 446 and a slicer circuit 448. The slicer circuits 446 and 448 each sample the analog signal y(t) based on the early clock signal clk_L. A decision threshold of the slicer circuit 446 is set based on $h_0-h_1$, and a decision threshold of the slicer circuit 448 is set based on $-h_0+h_1$. Outputs of the slicer circuits 446 and 448 are coupled to inputs of delay circuits 450 and 452, respectively. Outputs of the delay circuits 450 and 452 are coupled to inputs of delay circuits 454 and 456, respectively. Outputs of the delay circuits 454 and 456 are coupled to inputs of a multiplexer 458. A control input of the multiplexer 458 receives the data sample $d_k$. An output of the multiplexer 458 provides the sample $x\_L_k$ based on the early clock.

The slicer 308-2 includes a slicer circuit 460 and a slicer circuit 462. The slicer circuits 460 and 462 each sample the analog signal y(t) based on the late clock signal clk_R. A decision threshold of the slicer circuit 460 is set based on $h_0-h_1$, and a decision threshold of the slicer circuit 462 is set based on $-h_0+h_1$. Outputs of the slicer circuits 460 and 462 are coupled to inputs of delay circuits 464 and 466, respectively. Outputs of the delay circuits 464 and 466 are coupled to inputs of delay circuits 468 and 470, respectively. Outputs of the delay circuits 468 and 470 are coupled to inputs of a multiplexer 472. A control input of the multiplexer 472 receives the data sample $d_k$. An output of the multiplexer 472 provides the sample $x\_R_k$ based on the late clock.

Figure 5:
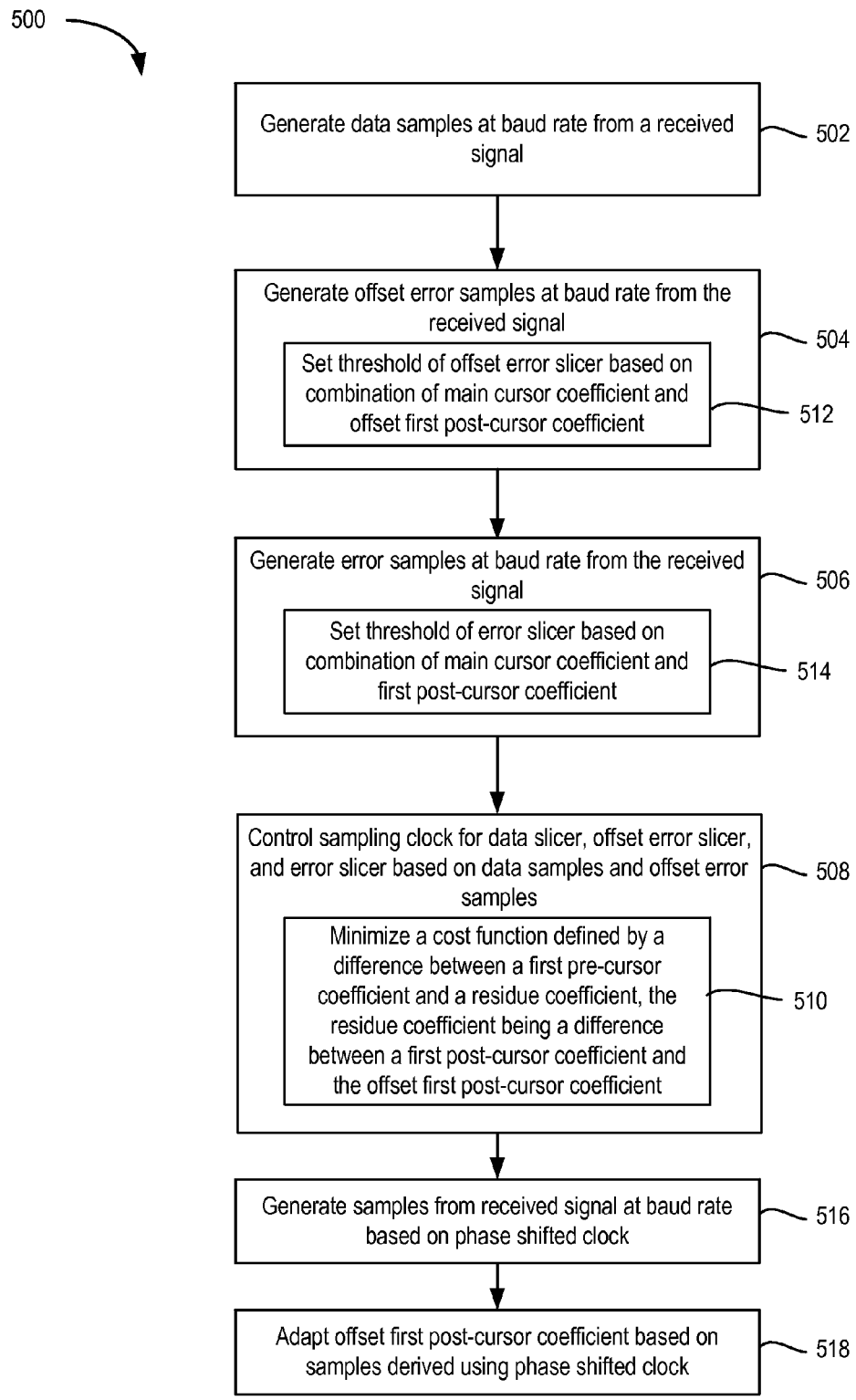
FIG. 5 is a flow diagram depicting a method of clock data recovery (CDR) for a receiver according to an example.

FIG. 5 is a flow diagram depicting a method 500 of clock data recovery (CDR) for a receiver according to an example. The method 500 can be performed by the receiver 110 described above. The method 500 begins at block 502, where the data slicer 302 generates data samples at the baud rate from a received signal. At block 504, the offset error slicer 304 generates offset error samples at the baud rate from the received signal. At block 506, the error slicer 306 generates error samples at the baud rate from the received signal. At block 508, the CDR 112 controls a sampling clock for the data slicer 302, the offset error slicer 304, and the error slicer 306 based on the data samples and the offset error samples.

The block 508 can include a block 510, where the CDR 112 minimizes a cost function defined by a difference between a first pre-cursor coefficient and a residue coefficient, the residue coefficient comprising a difference between a first post-cursor coefficient and the offset first post-cursor coefficient.

The block 504 can include a block 512, where the offset error slicer 304 sets its threshold based on a combination of the main cursor coefficient and the offset first post-cursor coefficient. The block 506 can include a block 514, where the error slicer 306 sets its threshold based on a combination of a main cursor coefficient and the first post-cursor coefficient.

In an example, the method 500 can further include a block 516, where slicer(s) 308 generate samples from the received signal at the baud rate based on a phase shifted clock having a phase shift with respect to the sampling clock. At block 518, the decision adapt circuit 212 can use the samples from the slicer(s) 308 to adapt the offset first post-cursor coefficient used to generate the offset error samples used by the CDR circuit 112.

While specific examples have been described above, the techniques described herein can be applied to other examples. For example, while a speculative DFE is described, the techniques described herein can be used with a direct feedback DFE. While the DFE is shown as processing an analog signal output by an AFE, in other examples, an analog-to-digital converter (ADC) can be disposed between the AFE and the DFE and the DFE can operate on a digital signal. Further, the technique of using an offset to control the timing location of a CDR can be generally applied with or without DFE or in any multi-tap DFE architecture. While specific cost functions have been described above, the techniques described herein can be used with CDRs that minimize other cost functions.

Figure 6:
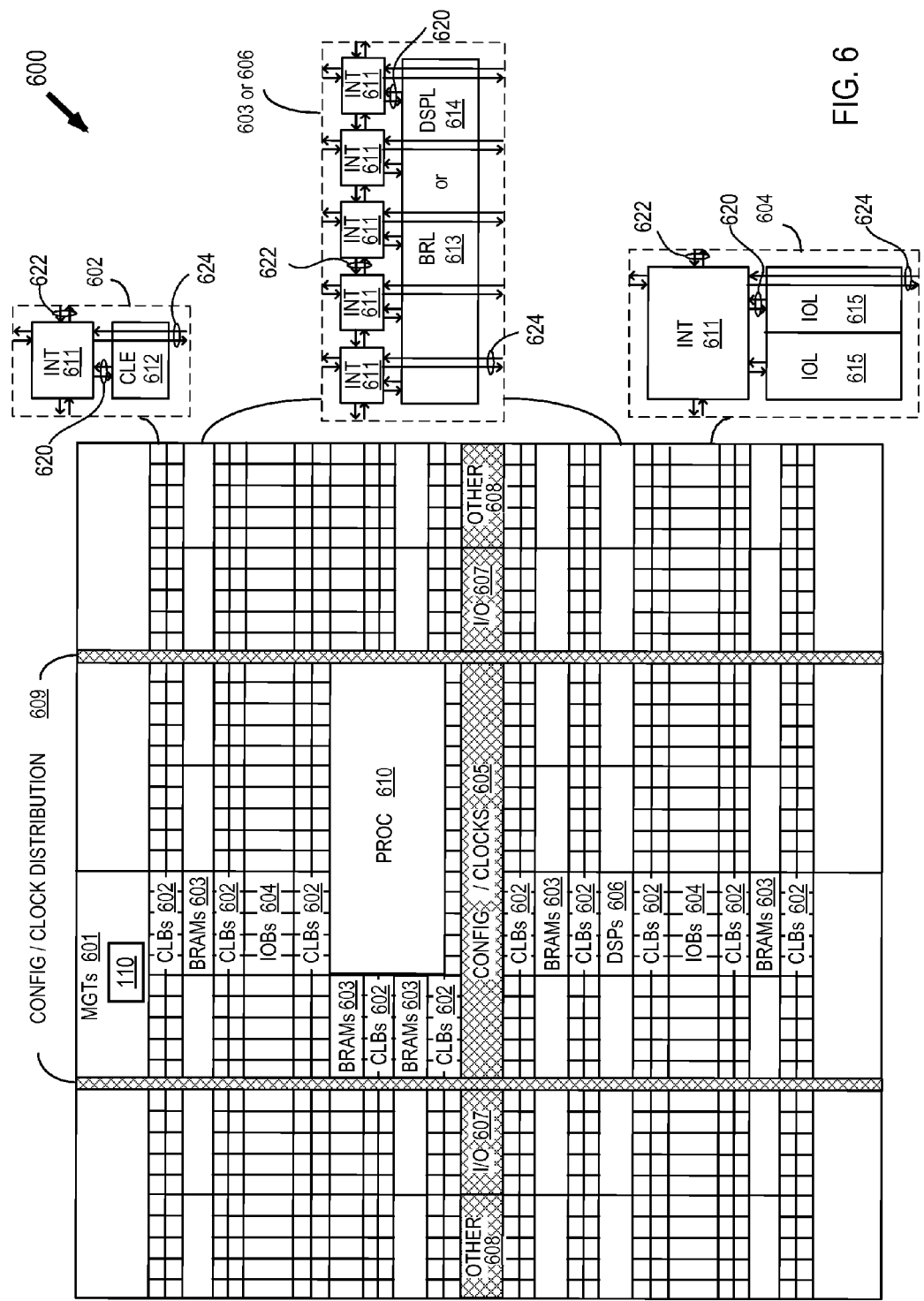
FIG. 6 illustrates a field programmable gate array (FPGA) architecture in which examples described herein can be utilized.

The CDR systems described herein can be used in serial receivers or transceivers disposed in an IC, such as an FPGA. FIG. 6 illustrates an FPGA architecture 600 that includes a large number of different programmable tiles including multi-gigabit transceivers ("MGTs") 601, configurable logic blocks ("CLBs") 602, random access memory blocks ("BRAMs") 603, input/output blocks ("IOBs") 604, configuration and clocking logic ("CONFIG/CLOCKS") 605, digital signal processing blocks ("DSPs") 606, specialized input/output blocks ("I/O") 607 (e.g., configuration ports and clock ports), and other programmable logic 608 such as digital clock managers, analog-to-digital converters, system monitoring logic, and so forth. Some FPGAs also include dedicated processor blocks ("PROC") 610.

In some FPGAs, each programmable tile can include at least one programmable interconnect element ("INT") 611 having connections to input and output terminals 620 of a programmable logic element within the same tile, as shown by examples included at the top of FIG. 6. Each programmable interconnect element 611 can also include connections to interconnect segments 622 of adjacent programmable interconnect element(s) in the same tile or other tile(s). Each programmable interconnect element 611 can also include connections to interconnect segments 624 of general routing resources between logic blocks (not shown). The general routing resources can include routing channels between logic blocks (not shown) comprising tracks of interconnect segments (e.g., interconnect segments 624) and switch blocks (not shown) for connecting interconnect segments. The interconnect segments of the general routing resources (e.g., interconnect segments 624) can span one or more logic blocks. The programmable interconnect elements 611 taken together with the general routing resources implement a programmable interconnect structure ("programmable interconnect") for the illustrated FPGA.

In an example implementation, a CLB 602 can include a configurable logic element ("CLE") 612 that can be programmed to implement user logic plus a single programmable interconnect element ("INT") 611. A BRAM 603 can include a BRAM logic element ("BRL") 613 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 606 can include a DSP logic element ("DSPL") 614 in addition to an appropriate number of programmable interconnect elements. An IOB 604 can include, for example, two instances of an input/output logic element ("IOL") 615 in addition to one instance of the programmable interconnect element 611. As will be clear to those of skill in the art, the actual I/O pads connected, for example, to the I/O logic element 615 typically are not confined to the area of the input/output logic element 615.

In the pictured example, a horizontal area near the center of the die (shown in FIG. 6) is used for configuration, clock, and other control logic. Vertical columns 609 extending from this horizontal area or column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, processor block 610 spans several columns of CLBs and BRAMs. The processor block 610 can various components ranging from a single microprocessor to a complete programmable processing system of microprocessor(s), memory controllers, peripherals, and the like.

Note that FIG. 6 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 6 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In an example, one or more of the MGTs 601 can include instance(s) of the receiver 110.

While the foregoing is directed to specific examples, other and further examples may be devised without departing from the basic scope thereof, and the scope thereof is determined by the claims that follow.

What is claimed is:

1. An apparatus for clock data recovery (CDR) in a receiver, comprising:
 a decision feedback equalizer (DFE) having a data slicer providing data samples, an error slicer providing error samples, and an offset error slicer providing offset error samples, the offset error slicer configured to set its threshold based on an offset first post-cursor coefficient; and
 a CDR circuit configured to control a sampling clock for the data slicer, the error slicer, and the offset error slicer based on the data samples and the offset error samples.

2. The apparatus of claim 1, wherein the CDR circuit is further configured to minimize a cost function defined by a difference between a first pre-cursor coefficient and a residue coefficient, the residue coefficient comprising a difference between a first post-cursor coefficient and the offset first post-cursor coefficient.

3. The apparatus of claim 2, wherein the error slicer is configured to set its threshold based on a combination of a main cursor coefficient and the first post-cursor coefficient, and wherein the offset error slicer is configured to set its threshold based on a combination of the main cursor coefficient and the offset first post-cursor coefficient.

4. The apparatus of claim 2, wherein the DFE includes at least one additional slicer each configured to output samples based on a phase shifted clock having a phase shift with respect to the sampling clock.

5. The apparatus of claim 4, wherein the at least one additional slicer comprises a first additional slicer configured to output first samples based on an early clock with respect to the sampling clock, and a second additional slicer configured to output second samples based on a late clock with respect to the sampling clock.

6. The apparatus of claim 5, further comprising:
 a decision adapt circuit configured to generate an early main cursor coefficient based on the first samples and a late main cursor coefficient based on the second samples;
 wherein the decision adapt circuit is further configured to increment or decrement the offset first post-cursor coefficient based on a comparison of the early main cursor coefficient and the late main cursor coefficient.

7. The apparatus of claim 4, wherein the at least one additional slicer comprises a first additional slicer configured to output first samples based on an early or late clock with respect to the sampling clock, and wherein the apparatus further comprises:
 a decision adapt circuit configured to generate a shifted main cursor coefficient based on the first samples;
 wherein the decision adapt circuit is further configured to increment or decrement the offset first post-cursor coefficient based on a comparison between a main cursor coefficient and the shifted main cursor coefficient.

8. A receiver, comprising:
 an analog front end (AFE) configured to receive an analog signal from a channel;
 a decision feedback equalizer (DFE) having a data slicer configured to generate data samples from an output of the AFE, an error slicer configured to generate error samples from the output of the AFE, and an offset error slicer configured to generate offset error samples from the output of the AFE, the offset error slicer configured to set its threshold based on an offset first post-cursor coefficient;
 a decision adapt circuit configured to generate pulse response coefficients for the DFE based on the data samples, the error samples, and the offset error samples; and
 a CDR circuit configured to control a sampling clock for the data slicer, the error slicer, and the offset error slicer based on the data samples and the offset error samples.

9. The receiver of claim 8, further comprising:
 a phase interpolator configured to adjust a phase of a reference clock signal based on an output of the CDR; and
 a clock buffer circuit configured to output the sampling clock based on an output of the phase interpolator.

10. The receiver of claim 8, wherein the CDR circuit is further configured to minimize a cost function defined by a difference between a first pre-cursor coefficient and a residue coefficient, the residue coefficient comprising a difference between a first post-cursor coefficient and the offset first post-cursor coefficient.

11. The receiver of claim 10, wherein the error slicer is configured to set its threshold based on a combination of a main cursor coefficient and the first post-cursor coefficient, and wherein the offset error slicer is configured to set its threshold based on a combination of the main cursor coefficient and the offset first post-cursor coefficient.

12. The receiver of claim 10, wherein the DFE includes at least one additional slicer each configured to output samples based on a phase shifted clock having a phase shift with respect to the sampling clock.

13. The receiver of claim 12, wherein the at least one additional slicer comprises a first additional slicer configured to output first samples based on an early clock with respect to the sampling clock, and a second additional slicer configured to output second samples based on a late clock with respect to the sampling clock.

14. The receiver of claim 13, wherein the decision adapt circuit is configured to generate an early main cursor coefficient based on the first samples and a late main cursor coefficient based on the second samples, and wherein the decision adapt circuit is further configured to increment or decrement the offset first post-cursor coefficient based on a comparison of the early main cursor coefficient and the late main cursor coefficient.

15. The receiver of claim 12, wherein the at least one additional slicer comprises a first additional slicer configured to output first samples based on an early or late clock with respect to the sampling clock, wherein the decision adapt circuit is configured to generate a shifted main cursor coefficient based on the first samples, and wherein the decision adapt circuit is further configured to increment or decrement the offset first post-cursor coefficient based on a comparison between a main cursor coefficient and the shifted main cursor coefficient.

16. A method of clock data recovery (CDR) for a receiver, comprising:
    generating, at a baud rate, data samples from a received signal using a data slicer of a decision feedback equalizer (DFE);
    generating, at the baud rate, error samples from the received signal using an error slicer of the DFE;
    generating, at the baud rate, offset error samples from the received signal using an offset error slicer of the DFE, the offset error slicer configured to set its threshold based on an offset first post-cursor coefficient; and
    generating a sampling clock for the data slicer, the error slicer, and the offset error slicer based on the data samples and the offset error samples.

17. The method of claim 16, wherein to step of generating the sampling clock comprises minimizing a cost function defined by a difference between a first pre-cursor coefficient and a residue coefficient, the residue coefficient comprising a difference between a first post-cursor coefficient and the offset first post-cursor coefficient.

18. The method of claim 17, wherein the step of generating the error samples comprises setting a threshold of the error slicer based on a combination of a main cursor coefficient and the first post-cursor coefficient, and wherein the step of generating the offset error samples comprises setting a threshold of the offset error slicer based on a combination of the main cursor coefficient and the offset first post-cursor coefficient.

19. The method of claim 16, further comprising:
    generating, at the baud rate, samples from the received signal from at least one additional slicer, each of the at least one additional slicer operating based on a phase shifted clock having a phase shift with respect to the sampling clock.

* * * * *